Oct. 17, 1950 F. J. GAUTHIER 2,526,470
CLAMP AND TUBE ASSEMBLY
Filed Sept. 16, 1947
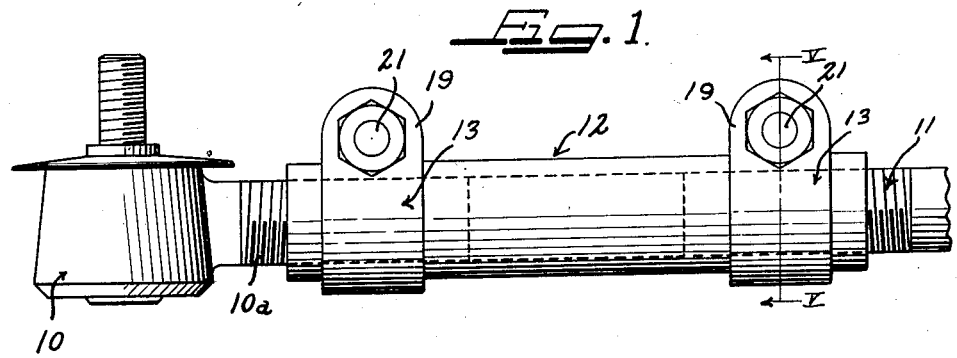
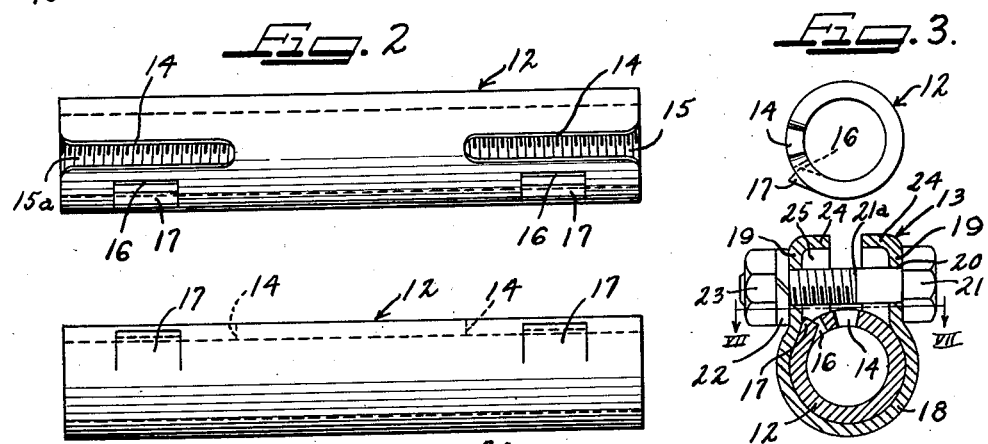
Inventor
FRED J. GAUTHIER.

Patented Oct. 17, 1950

2,526,470

UNITED STATES PATENT OFFICE 2,526,470

CLAMP AND TUBE ASSEMBLY

Fred J. Gauthier, Detroit, Mich., assignor to Thompson Products, Inc., Cleveland, Ohio, a corporation of Ohio Application September 16, 1947, Serial No. 774,260

6 Claims. (Cl. 287—60)

This invention relates to a clamp and tube assembly wherein clamps can be loosely mounted on a tube and held in correct position thereon to facilitate subsequent tightening of the clamps in mounting the assembly.

Specifically the invention deals with an adjusting sleeve for use between a tie rod and a tie rod joint which sleeve is equipped with turned-out lug sections for retaining clamps in proper longitudinal and radial position on the sleeve.

The invention will hereinafter be specifically described as embodied in its preferred form of an adjusting sleeve for tie rod assemblies, but it should be understood that the principles of the invention are generally applicable to clamping rings and collapsible tubes acted on by the rings.

According to this invention an adjusting sleeve is formed by curling a piece of strip steel into the shape of a tube. The strip has slots extending inwardly from the ends thereof so as to provide split end portions in the tube. A pair of lugs are lanced out of the strip and are so positioned to hold clamping rings against radial and longitudinal displacement on the tube formed from the strip. The clamping rings are provided for contracting the slotted ends of the tube and the lugs are therefore formed to hold the rings around these slotted ends. The clamping rings have cupped clamping tabs receiving a draw bolt therethrough and the lugs fit within the recess of a cupped tab. The lugs project outwardly from the tube to engage the draw bolt and prevent rotation of the ring beyond its clamping position. The assembly is especially useful to facilitate shipping of clamping ring-equipped adjusting sleeves, since the clamps can be loose on the sleeve without danger of displacement. This avoids heretofore necessary separate shipping of clamps and tubes, or tightening of the clamps on the tubes followed by loosening of the clamps to permit mounting.

In the preferred embodiment the adjusting sleeve is internally threaded at the slotted ends thereof, with one end having a left-hand thread and the other end having a right-hand thread. One end is threaded around a tie rod and the other end receives the threaded stem of a tie rod joint therein. Rotation of the sleeve will adjustably space the tie rod end from the end of the tie rod and when the desired adjustment has been made the draw bolts of the clamps are easily tightened to lock the sleeve in adjusted position.

It is, then, an object of this invention to provide a clamp and tube assembly accommodating loose mounting of clamps on the tube while retaining the clamps in proper longitudinal and radial relation relative to the tube.

A further object of the invention is to provide an adjusting sleeve with outturned lugs for retaining clamping rings.

A still further object of the invention is to provide a clamp and tube assembly wherein a clamping ring surrounding a tube is held in correct position on the tube by an outturned lug on the tube.

A still further object of the invention is to provide an adjusting sleeve for a tie rod and tie rod end assembly with slotted threaded ends carrying outturned lugs to retain clamping rings around the slotted ends.

A still further object of the invention is to provide a lug retainer for a clamping ring which permits assembly of the ring before the clamping bolt is threaded into the ring and which retains the ring against longitudinal movement and against rotational movement beyond a predetermined angle after the clamping bolt is inserted in the clamping ring.

Other and further objects of the invention will be apparent to those skilled in the art from the following detailed description of the annexed sheet of drawings which, by way of a preferred example only, illustrates one embodiment of the invention.

On the drawings:

Figure 1 is a side elevational view of an adjusting sleeve according to this invention mounted in position between a tie rod and a tie rod end or joint.

Figure 2 is a plan view of the sleeve shown in Figure 1 with the clamping rings removed.

Figure 3 is an end elevational view of the sleeve of Figure 2.

Figure 4 is a side elevational view of the sleeve shown in Figure 1.

Figure 5 is a transverse cross-sectional view taken along the line V—V of Figure 1, with parts in elevation.

Figure 6 is a view similar to Figure 5 but illustrating the manner in which the clamping ring is held against free rotation on the tube.

Figure 7 is a horizontal cross-sectional view taken along the line VII—VII of Figure 5.

Figure 8 is a cross-sectional view similar to Figures 5 and 6 but illustrating the manner in which the clamping ring can be threaded on or removed from the sleeve when the draw bolt is removed from the ring.

Figure 9 is a plan view of a strip of metal from which the sleeve is formed.

As shown on the drawings:

In Figure 1 a tie rod end or joint 10 has the threaded stem 10a thereof adjustably connected to the threaded end of a tie rod 11 through the media of an adjusting sleeve or tube 12 of this invention. The sleeve 12 has clamping rings 13 surrounding the end portions thereof to lock the sleeve in adjusted position relative to both the stem and tie rod.

As shown in Figures 2 to 4, the sleeve or tube 12 has slots 14 extending inwardly from its ends. These slotted ends of the tube are internally threaded with one end having a right-hand thread 15 and the other end having a left-hand thread 15a. Kerfs 16 are formed in the tube alongside of the slots 14 and lugs 17 are turned up from these kerfs to extend parallel with the slots along the mid-portions of the slots.

The clamps 13 each have a split annular band portion 18 with a radially projecting tab 19 on each end thereof. The tabs 19 are disposed in opposed relationship and have transverse holes 20 therethrough to receive freely therethrough the shank 21a of a clamping bolt 21. The head of the bolt 21 is bottomed on one tab 19 and the threaded end of the shank 21a projects through the other tab 19 to receive on its projecting end a locking washer 22 and a nut 23 in threaded relation with the shank. When the clamping bolt 21 is tightened, the tabs are drawn together to contract the ring body 18 around the sleeve 12 thereby decreasing the width of the slot 14 and clamping the sleeve around the inserted member.

In order to stiffen the clamping tabs 19 against bending from the forces exerted by the clamping bolt, each tab is provided around its periphery with an inwardly turned flange 24. These flanges extend across the free ends of the tabs and down along the sides of the tabs to overlie the member surrounded by the body portion 18. Recesses 25 are therefore provided in the tabs bounded by the flanges 24.

The lugs 17 of the sleeve are adapted to fit in the recesses 25 of the clamping tabs and, as shown in Figure 7, the side flanges 24 of the tab will overlie the ends of the lug. The clamping ring therefore is held against longitudinal movement on the sleeve.

As illustrated in Figure 6, the shank 21a of the clamping bolt 21 will abut the lug 17 when the clamping ring 13 is rotated in one direction on the sleeve 12. When the ring is rotated in the other direction, the clamping tab 19 will abut the lug and this arrangement prevents appreciable rotation of the clamping ring on the sleeve so that the draw bolt assembly is always held adjacent the slot 14 in the sleeve.

As shown in Figure 8, when the draw bolt 21 is removed from the clamping ring 13 the ring can be tilted to the illustrated position with the gap between the clamping tab flanges aligned with the lug 17. In this rotated position of the ring it can be slipped over the tube and lug because the lug will fit in the gap 26 unimpeded by the clamping bolt. After the clamping ring is thus slipped on the sleeve, it is rotated to an upright position and the clamping bolt 21 is inserted through the holes 20 to prevent rotation of the ring back to the position for aligning the lug 17 in the gap 26. Therefore as soon as the clamping bolt is inserted in the ring, the ring is loosely held on the sleeve.

As shown in Figure 9 the sleeve 12 is conveniently formed from a flat strip of metal 27. The slots 14 and kerfs 16 are conveniently cut into this flat strip. The lugs 17 are then readily raised from the kerfs and the tube can be curled around a mandrel or other shaping die to form the tube. The abutting ends of the strip can be locked together by a seam, a weld or the like if desired.

As illustrated in Figure 1, the right and left-hand threaded ends of the sleeve 12 respectively receive the right- and left-hand threaded ends of the tie rod 11 and stem 10a. Rotation of the sleeve 12 thereupon varies the spacing of the tie rod joint 10 from the end of the rod 11 and the sleeve functions in the manner of a turnbuckle. When the desired spacing between the tie rod end or joint 10 and the tie rod 11 has been achieved, the draw bolts 21 are tightened in the clamping rings 13 to contract the slotted ends of the sleeve 12 around the members threaded therein thereby locking the sleeve against further movement relative to these members.

From the above descriptions it will be clear that the invention provides a simple, inexpensive assembly of clamping rings and tubes or sleeves wherein the clamping rings are loosely retained on the sleeve or tube in their operating positions.

It will, of course, be understood that various details of construction may be varied through a wide range without departing from the principles of this invention and it is, therefore, not the purpose to limit the patent granted hereon otherwise than necessitated by the scope of the appended claims.

I claim as my invention:

1. A tube and clamp assembly comprising a tubular member having a slotted portion adapted to be contracted, a clamping ring surrounding said slotted portion and having opposed clamping tabs, one of said tabs having a recess therein, and an outturned kerf on said tube extending into said recess for holding the clamping ring against displacement on the tube.

2. A tube and clamp assembly comprising a tube having a slotted portion adapted to be contracted, a clamping ring surrounding said portion and having radially extending clamping tabs, inturned flanges on said tabs defining opposed recesses, a draw bolt extending through said tabs, a kerf in said tube, and a lug turned out from said kerf into the recess of one of said tabs for coacting with said flanges to hold the ring against longitudinal displacement on the tube and for coacting with said tab and said draw bolt for holding the ring against rotational displacement on the tube.

3. A tube and clamping ring assembly comprising a tube having a portion adapted to be contracted and a lug extending outwardly from said portion of the tube, a clamping ring having a split annular body adapted to surround said portion of the tube and radially extending clamping tabs in spaced opposed relation and adapted to receive a draw bolt therethrough for decreasing the space therebetween to contract the body of the ring, said lug on the tube adapted to fit in said space between the tabs before said clamping bolt is inserted into the tabs, and said clamping bolt holding said space between the tabs out of alignment with the lug whereby the lug will hold the clamping ring against longitudinal and rotational displacement on the tube.

4. A clamping tube assembly comprising a tube member having a slotted end portion, a kerf in said slotted end portion adjacent the slot thereof, a lug turned out from said kerf to project beyond the wall of the tube, a clamping ring having a split annular band portion around said slotted end of the tube together with opposed clamping tabs projecting radially from the ends of said band portion, said clamping tabs having inturned flanges therearound defining recesses, one of said recesses receiving said lug whereby said lug is effective to hold the clamping ring against longitudinal displacement on the tube, and a draw bolt extending through said clamping tabs to draw said tabs together, said draw bolt engaging said lug when said clamping tabs are moved out of alignment with the slot in said tube whereby said lug also functions to hold the clamping ring in proper position circumferentially of said tube.

5. An adjusting sleeve suitable for adjustably connecting a tie rod with a tie rod joint which comprises a tube having longitudinally slotted end portions, a left-hand thread in one slotted end portion of the tube, a right-hand thread in the opposite slotted end portion of the tube, kerfs in said slotted end portions of the tube adjacent the slots thereof, lugs extending outwardly from said kerfs in spaced parallel relation to the slots along the mid-portions of the slots, clamping rings having split annular body portions surrounding the slotted portions of the tube, tabs extending radially from the ends of said body portions, inturned flanges on said tabs, a clamping bolt assembly extending through the opposed tabs of each clamping ring and bridging the space between the tabs in overlying relation with the slot in the tube, and said lugs extending into the recesses provided by a flanged tab of each clamping ring for abutting said flanges to prevent longitudinal displacement of the ring and for engaging the clamping bolt to stop excessive rotational displacement of the ring.

6. An adjusting sleeve adapted for connecting a tie rod with a tie rod joint comprising a tube having longitudinally slotted internally threaded end portions, and clamping ring retainer lugs turned out from kerfs in said end portions and arranged to project into the path of movement of clamping rings to hold the rings against free rotation on the tube.

FRED J. GAUTHIER.

REFERENCES CITED

The following references are of record in the file of this patent:

UNITED STATES PATENTS

| Number | Name | Date |
|---|---|---|
| Re. 19,482 | Baker | Mar. 5, 1935 |
| 612,685 | Thorp et al. | Oct. 18, 1898 |
| 736,927 | Bicalky | Aug. 25, 1903 |
| 772,578 | Palmer | Oct. 18, 1904 |
| 1,237,950 | Phillips | Aug. 21, 1917 |
| 2,227,648 | Hufferd | Jan. 7, 1941 |
| 2,340,300 | Booth et al. | Feb. 1, 1944 |